US009890631B2

(12) United States Patent
Flores Perez

(10) Patent No.: US 9,890,631 B2
(45) Date of Patent: Feb. 13, 2018

(54) HYDRAULIC CASING COLLAR LOCATOR

(71) Applicant: BAKER HUGHES INCORPORATED, Houston, TX (US)

(72) Inventor: Juan Carlos Flores Perez, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 128 days.

(21) Appl. No.: 15/099,344

(22) Filed: Apr. 14, 2016

(65) Prior Publication Data

US 2017/0298723 A1     Oct. 19, 2017

(51) Int. Cl.
| | | |
|---|---|---|
| *E21B 47/09* | (2012.01) |
| *E21B 47/18* | (2012.01) |
| *E21B 34/06* | (2006.01) |
| *G01V 3/26* | (2006.01) |
| *G01V 5/04* | (2006.01) |
| *G01V 1/40* | (2006.01) |

(52) U.S. Cl.
CPC ............ *E21B 47/09* (2013.01); *E21B 34/06* (2013.01); *E21B 47/0905* (2013.01); *E21B 47/18* (2013.01); *G01V 1/40* (2013.01); *G01V 3/26* (2013.01); *G01V 5/04* (2013.01)

(58) Field of Classification Search
CPC .. E21B 47/09; E21B 47/0905; E21B 47/4718; E21B 34/06; G01V 3/26; G01V 5/04; G01V 1/40
See application file for complete search history.

(56) References Cited

U.S. PATENT DOCUMENTS

| | | | | | |
|---|---|---|---|---|---|
| 5,429,190 | A | * | 7/1995 | Kilgore | E21B 47/0905 166/113 |
| 6,041,860 | A | * | 3/2000 | Nazzal | E21B 23/002 166/250.01 |
| 6,148,263 | A | * | 11/2000 | Brooks | G05B 23/0256 702/6 |
| 6,896,056 | B2 | * | 5/2005 | Mendez | E21B 47/0905 166/254.2 |
| 8,312,925 | B2 | * | 11/2012 | Trummer | E21B 47/04 166/177.5 |
| 8,672,031 | B2 | * | 3/2014 | Vaynshteyn | E21B 47/04 166/297 |
| 8,899,322 | B2 | * | 12/2014 | Cresswell | E21B 47/04 166/255.1 |
| 8,910,716 | B2 | * | 12/2014 | Newton | E21B 43/12 166/191 |

(Continued)

*Primary Examiner* — John Fitzgerald
(74) *Attorney, Agent, or Firm* — Parsons Behle & Latimer

(57) ABSTRACT

A device, system, and method for locating collars along a casing string. The device includes a casing collar locator (CCL) and a valve in communication with the CCL connected to a work string. Fluid is pumped down the work string as the device is used to locate collars along a string. Upon detection of a collar, the CCL sends a signal to the valve, which causes the actuation of the valve to decreases a flow area within a work string. The decrease in flow area causes a pressure increase within the work string, which may be detected at the surface to indicate the detection of a collar. The device may include an amplifier and power source to amplify the signal from the CCL to the valve. The CCL may detect collars by a change in magnetic flux or by the detection of a signal emitted by individual collars.

22 Claims, 5 Drawing Sheets

(56) References Cited

U.S. PATENT DOCUMENTS

| | | | | |
|---|---|---|---|---|
| 2002/0148611 A1* | 10/2002 | Williger | ............ | E21B 33/10 |
| | | | | 166/297 |
| 2003/0051876 A1* | 3/2003 | Tolman | ............ | E21B 17/203 |
| | | | | 166/313 |
| 2010/0200226 A1* | 8/2010 | Trummer | ............ | E21B 43/114 |
| | | | | 166/255.1 |
| 2010/0230105 A1* | 9/2010 | Vaynshteyn | ...... | E21B 43/11857 |
| | | | | 166/297 |
| 2012/0055671 A1* | 3/2012 | Stromquist | ...... | E21B 23/006 |
| | | | | 166/298 |
| 2012/0090847 A1* | 4/2012 | Getzlaf | ............ | E21B 23/02 |
| | | | | 166/305.1 |

* cited by examiner

HYDRAULIC CASING COLLAR LOCATOR

FIELD OF THE DISCLOSURE

The embodiments described herein relate to a hydraulic casing collar locator (CCL) used to generate a pressure increase within a work string upon detection of collars along a casing string.

BACKGROUND

Description of the Related Art

There are present limitations in the oil and gas industry of accurately determining the downhole location of a tool within a cased wellbore. Casing strings are typically connected together with collars. These collars have been used to help determine the location of a tool along the casing string. A mechanical casing collar locator (CCL) may be connected to a work string, such as coiled tubing, in an attempt to determine the location of a tool connected to the work string. The mechanical CCL includes fingers that extend outward and engage a profile of a collar as each collar along the casing string is passed with the mechanical CCL. The engagement of the fingers with a profile on the collar provides tension in the work string that an operator at the surface detects. The tension indicates that a collar has been engaged by the mechanical CCL. In theory, the operator can send the tool to the end of the casing string and count each collar as the work string pulls the tool along the casing string until the tool is positioned at a desired location. One potential drawback to this location method, is the presence of false tension indicators encountered by the work string. For example, the work string may bind or hang up on a portion of the casing string, which is not a collar. This may provide a tension indicator at the surface that an operator incorrectly interprets as the mechanical CCL engaging a collar. Even one false tension indicator may lead to the incorrect assumption concerning the location of a tool within the wellbore.

Another method of determining the location of a tool within a wellbore is the use of an electric CCL that measures a change in magnetic flux between the casing string and each collar. As the electric CCL passes each collar, a change in the magnetic flux indicates that the next collar along the casing string has been encountered. While not susceptible to the false tension indicators or a mechanical CCL, the electric CCL must be connected to the surface so that an operator is made aware of each collar detected by the electric CCL. A communication line must be positioned inside the work string along the entire length from location of the electric CCL to the surface. The presence of a communication line within the work string presents some disadvantages. For example, the communication line limits the types of fluids that may be pumped down the work string as abrasive and/or corrosive fluids often used in the treatment and/or fracturing of a wellbore may not be used because such fluids may damage the communication line and/or the electric CCL. The communication line must be inserted along the entire length of the work string, which adds to the complexity of the system especially if the communication line is broken and needs to be replaced.

In an alternate configuration, an electric CCL may be used to locate collars along a casing string without a communication line connecting the electric CCL to the surface. Instead, a memory device records the determination that a collar is adjacent to the electric CCL as the CCL is moved along the casing string. In this configuration, the location of the tool is not determined in real time at the surface. Rather, the electric CCL must be removed from the well and the data from the memory device analyzed. The tool may then be tripped into the well using this data, but this requires two separate trips increasing the time and cost of the operation. Further, the data only provides the number and location of the collars along the casing string, but not the actual location of the tool as it is run back into the wellbore. This method will not account for any errors introduced as the tool is run into the wellbore a second time. In view of these and other disadvantages that may exist, an improved system and method of locating a tool along a casing string is desired.

SUMMARY

The present disclosure is directed to a hydraulic CCL and method of use that overcomes some of the problems and disadvantages discussed above.

One embodiment is a device comprising a CCL configured to individually detect one or more collars located along a casing string and a valve in communication with the CCL. Wherein upon detection of an individual collar of the one or more of collars the CCL sends a signal to the valve and wherein the valve is actuated upon reception of the signal from the CCL.

The device may include an amplifier in communication with the CCL and a power source in communication with the amplifier. The valve may be in communication with the CCL via the amplifier and the power source, wherein upon detection of an individual collar the CCL sends a signal to the amplifier and the amplifier sends and amplified signal to the valve causing the actuation of the valve upon reception of the signal from the amplifier.

The actuation of the valve restricts a flow area that creates a pressure increase. The pressure increase may be at least 200 psi. The CCL may be configured to detect a change in magnetic flux between the casing string and each collar of one or more collars located along a string. The CCL may comprise a magnet and a coil. Each collar of the one or more collars located along a string may emit a signal and the CCL may be configured to detect the emitted signal. Each collar of the plurality of collars may include a gamma isotope and the CCL may include a gamma ray detector.

One embodiment is a method of detecting collars along a casing string. The method comprises pumping fluid down a work string positioned within the casing string and moving the work string along the casing string. The method includes detecting a collar along the casing string with a CCL connected to the work string and actuating a valve within the work string due to the detection of the collar along the casing string, wherein the actuation of the valve causes a pressure increase within the work string.

The method may include detecting at a surface location the pressure increase within the work string. Actuating the valve may include reducing the flow of fluid through a portion of the work string. The method may include moving the work string to move the CCL past the collar and removing the flow reduction through the portion of the work string. Detecting the collar may include detecting a change in magnetic flux between the collar and the casing string. Detecting the collar may include detecting a signal emitted from the collar. Detecting a signal emitted from the collar may include detecting an emission from a gamma isotope with a gamma ray detector or detecting an acoustic signal emitted from an electric transducer.

One embodiment is a system to detect collars along a casing string. The system comprises a work string positioned within a casing string, a CCL configured to detect collars along the casing string, the CCL connected to the work string and being positioned within the casing string, and a valve in communication with the CCL, the valve being positioned within the work string. Wherein upon detection of a collar, the valve is actuated to reduce a flow area through a portion of the work string.

The system may include an amplifier in communication with the CCL, the amplifier being positioned within the casing string. Wherein the valve may be in communication with the CCL via the amplifier. The system may include a power source in communication with the amplifier, the power source being positioned within the casing string, wherein upon reception of the signal from the CCL, the amplifier sends a signal to the valve to actuate the valve. The work string may be coiled tubing. The actuation of the valve may create a pressure increase in the work string. The CCL may be configured to detect a change in magnetic flux between the casing string and the collar. Each collar may emit a signal and the CCL may be configured to detect the emitted signal.

Figure 1:
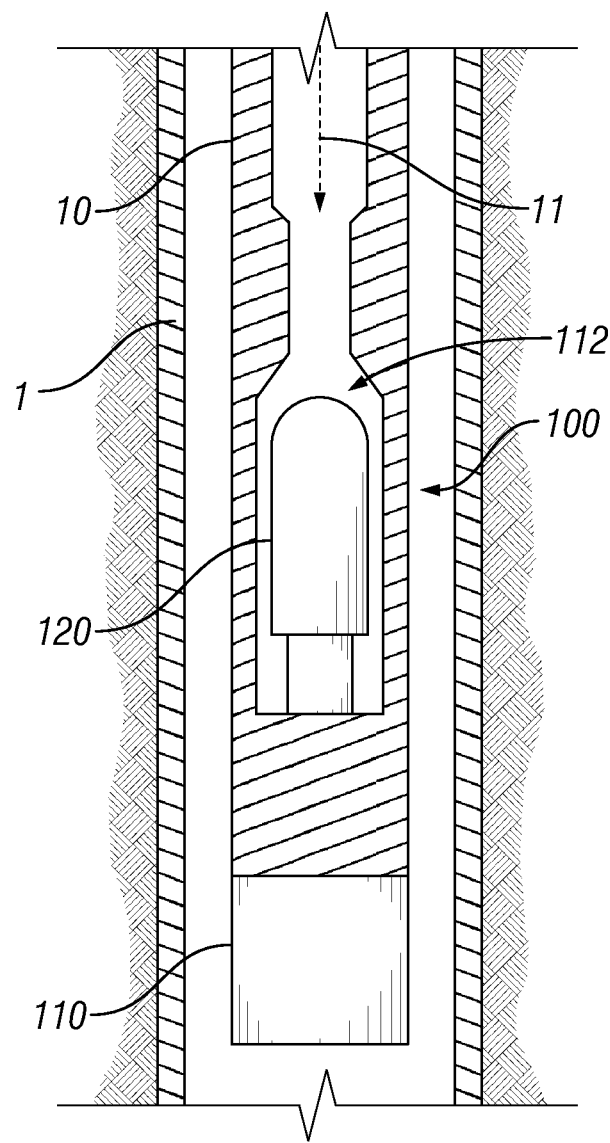
FIG. 1 shows an embodiment of a hydraulic CCL positioned within a casing string.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the invention as defined by the appended claims.

DETAILED DESCRIPTION

FIG. 1 shows an embodiment of a hydraulic CCL 100 positioned within a casing string 1. The hydraulic CCL 100 in connected to a work string 10, which may be various work strings such as coiled tubing, jointed pipe, etc., as would be appreciated by one of ordinary skill in the art having the benefit of this disclosure. The hydraulic CCL 100 includes a CCL 110 that is configured to detect collars 2 (shown in FIG. 2) along the casing string 1. Various CCL's 110 may be used in connection with the hydraulic CCL 100. For example, the CCL 110 may be configured detect a collar based on detection of a change in magnetic flux between the casing 1 and each individual collar 2 located along the casing. Alternatively, the CCL 110 may be configured to detect a signal emitted from each individual collar 2. For example, the CCL 110 may detect a radio frequency identification (RFID) signal emitted by each individual collar 2. The collar 2 may include a radioactive isotope, such as a gamma isotope that emits radiation that may be detected by a gamma ray detector. The CCL 100 may include a gamma ray detector to detect each individual collar 2 that includes a gamma isotope. Various other CCLs 110 may be used to detect a collar 2 along a casing 1 and used in connection with the hydraulic CCL 100 as would be appreciated by one of ordinary skill in the art having the benefit of this disclosure.

As discussed above, the hydraulic CCL 100 is connected to a work string 10, which is used to convey the hydraulic CCL 100 into a casing string 1. Fluid may be pumped down the work string and through the hydraulic CCL 100 as indicated by arrow 11 in FIG. 1. The fluid pumped through the work string 10 may be water. The hydraulic CCL 100 include a valve 120 positioned in the flow path through the hydraulic CCL 100. The valve 120 may be actuated to decrease a flow area 112 through the hydraulic CCL 100 as described herein. FIG. 1 shows the valve 120 in a non-actuated state. When the CCL 110 of the hydraulic CCL 100 is positioned adjacent to a collar 2 along the casing string 1, the valve 120 will move from a non-actuated state to an actuated state to decrease the flow area 112 of the hydraulic CCL 100.

Figure 2:
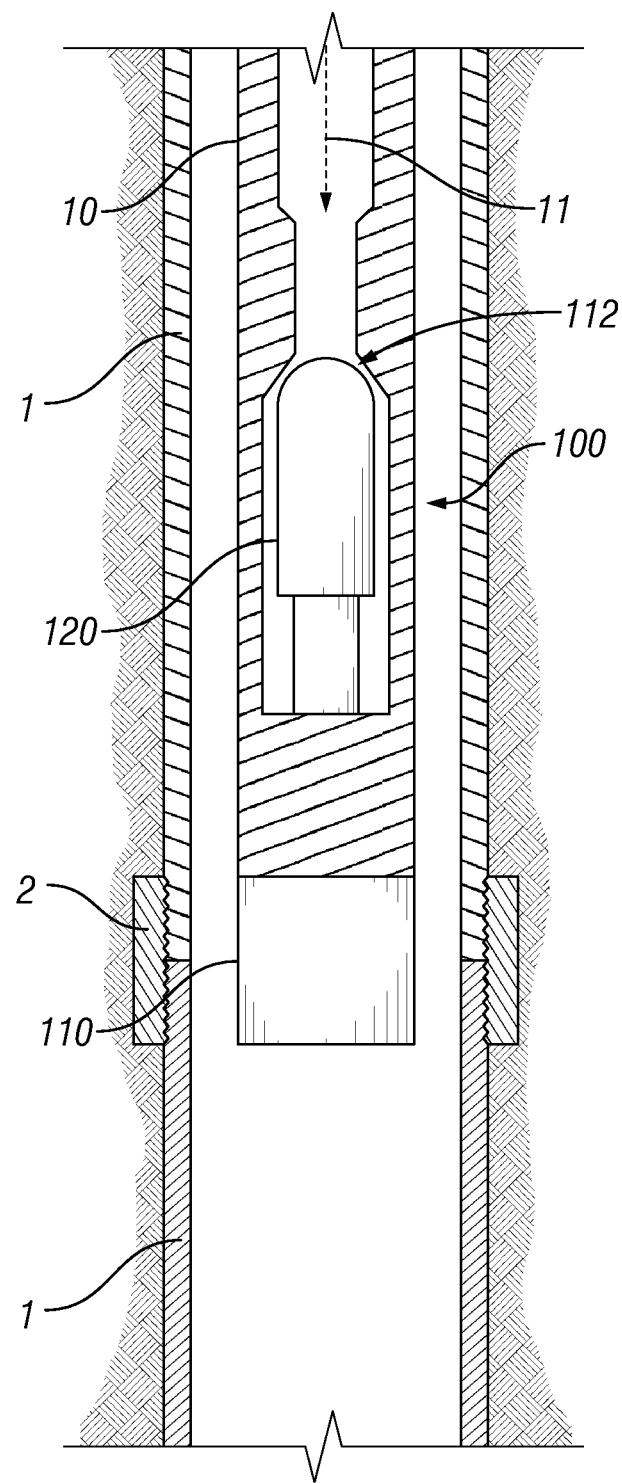
FIG. 2 shows an embodiment of a hydraulic CCL positioned adjacent a collar along a casing string.

FIG. 2 shows the CCL 120 of the hydraulic CCL 100 positioned adjacent to a collar 2 along a casing string 1. Upon detection of a collar 2, the CCL 120 sends a signal that triggers the actuation of the valve 120 to decrease the flow area 112 through the hydraulic CCL 100. Fluid is pumped down the work string 10 at a constant rate while the work string 10 moves the hydraulic CCL 100 along the casing string 1 to locate the collars 2 along the casing string 1. When a collar 2 is located by the CCL 120, the CCL 120 sends a signal that actuates the valve 120, which decreases the flow area 112 through the hydraulic CCL 100. A pressure increase may be detected at the surface upon actuation of the valve 120 as water is an incompressible fluid. The valve 120 does not need to entirely close off the flow area 112 in order to create a pressure increase within the work string 10 that is detectable at the surface. For example, a decrease in the flow area by at least 25% will create a pressure increase at the surface that will be detectable to indicate that a collar has been located. The decrease in flow area will depend on the flow area and fluid flow through the hydraulic CCL 100 as would be appreciated by one of ordinary skill in the art having the benefit of this disclosure. The change in flow area may be varied by application as long as it provides a detectable pressure change at the surface. The detectable pressure change at the surface may vary, but in some embodiments a minimum pressure change of at least 100 psi or 200 psi may be preferred. In some embodiments, the valve 120 may completely close the flow area when actuated. The pressure increase is detected at the surface almost instantaneously with the actuation of the valve due to the incompressible nature of various fluids, such as water. FIG. 2 shows the actuation of the valve 120 decreasing the flow area 112 through the hydraulic CCL 100.

Figure 3:
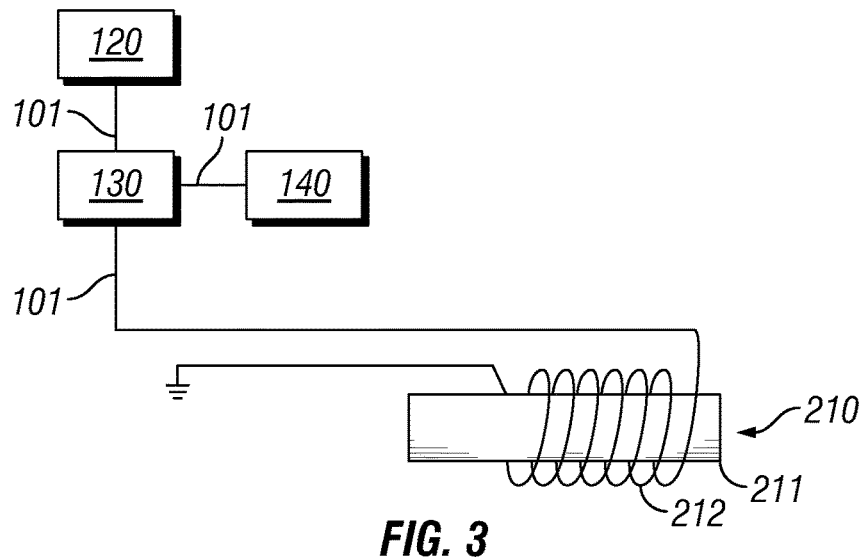
FIG. 3 shows a schematic of one embodiment of a hydraulic CCL.

The detection signal from a conventional CCL 110 may not be strong enough to actuate a valve 120. An amplifier may be needed to amplify the signal from the CCL 110 in order to properly actuate the valve 120. FIG. 3 shows a schematic of one embodiment of a CCL 210 configured to detect a collar 2 based on the change in magnetic flux between the casing 1 and each individual collar 2. The CCL 210 includes a passive magnet 211 and a coil 212. A change in magnetic flux creates a signal that is communicated from the CCL 210 to an amplifier 130 via a communication line 101. The amplifier 130 may be connected to a downhole power source 140 via a communication line 101. The amplifier 130 combined with the power source 140 sends an amplified signal to the valve 120 via a communication line 101 that triggers the actuation of the valve 120 upon detection of a collar 2. The power source 140 may be a battery located within the hydraulic CCL 100. The configuration, location, and connections of the valve 120, amplifier 130, power source 140, and CCL 210 are for illustrative purposes only and may be varied within the scope of the disclosure as would be appreciated by one of ordinary skill in the art having the benefit of this disclosure. For example, one or more of the connections between the components could potentially be wireless. The connections between the components within the hydraulic CCL may be enclosed to permit the use of corrosive and/or abrasive fluids without damaging the connections and/or components.

Figure 4:
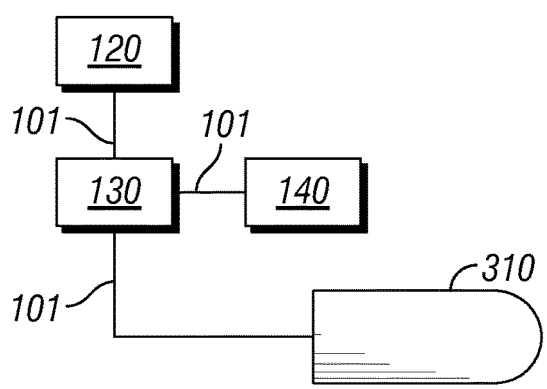
FIG. 4 shows a schematic of one embodiment of a hydraulic CCL.

FIG. 4 shows a schematic of one embodiment of a CCL 310 configured to detect a collar 2 based on a signal emitted from each individual collar 2. For example, the CCL 310 may detect the emission of radiation from a gamma isotope or detect a RFID signal. The CCL 310 creates a signal that is communicated from the CCL 310 to an amplifier 130 via a communication line 101. The amplifier 130 may be connected to a downhole power source 140 via a communication line 101. The amplifier 130 combined with the power source 140 sends an amplified signal to the valve 120 via a communication line 101 that triggers the actuation of the valve 120 upon detection of a collar 2. The power source 140 may be a battery located within the hydraulic CCL 100. The configuration, location, and connections of the valve 120, amplifier 130, power source 140, and CCL 310 are for illustrative purposes only and may be varied within the scope of the disclosure as would be appreciated by one of ordinary skill in the art having the benefit of this disclosure.

Figure 5:
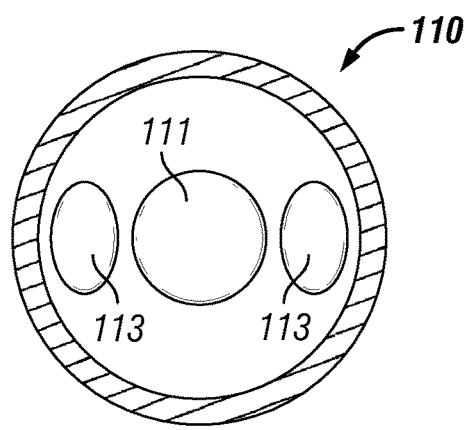
FIG. 5 shows an end view of one embodiment of a hydraulic CCL.

FIG. 5 shows a bottom view of one embodiment of a CCL 110 that may be used in a hydraulic CCL 100. The CCL 110 may include a magnet 111 and flow areas 113 that permit fluid pumped down the work string 10 to exit the hydraulic CCL 100. The use of a hydraulic CCL 100 to locate collars 2 along a casing string 1 provides an accurate location tool that indicates the location almost immediately at the surface and permits various treatment fluids, such as fracturing fluids, to be pumped down the tubing string 10 without damaging the hydraulic CCL 100. The valve 120 used in the hydraulic CCL 100 may be very robust and be used with a wide range of treatment fluids as would be appreciated by one of ordinary skill in the art having the benefit of this disclosure.

Figure 6:
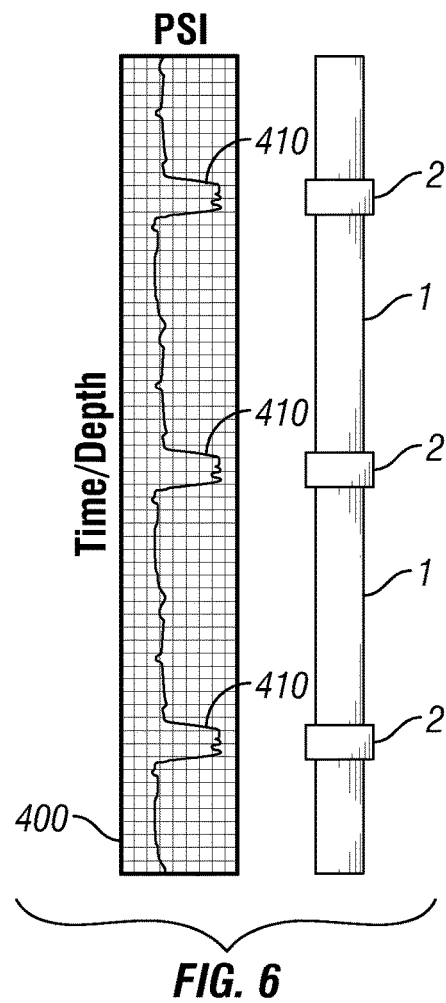
FIG. 6 shows the pressure increase for individual collars located along a casing string.

FIG. 6 shows a pressure schematic 400 positioned adjacent a casing string 1 having a plurality of collars 2. The pressure schematic 400 indicates the pressure within the work string 10 when the CCL 110 of the hydraulic CCL 100 is positioned along the casing string 1. An increase in pressure within the work string 10 is indicated by spike 410 on the pressure schematic 400 at each collar 2 along the casing string 1 that is detected by the CCL 110 of the hydraulic CCL 100.

Figure 7:
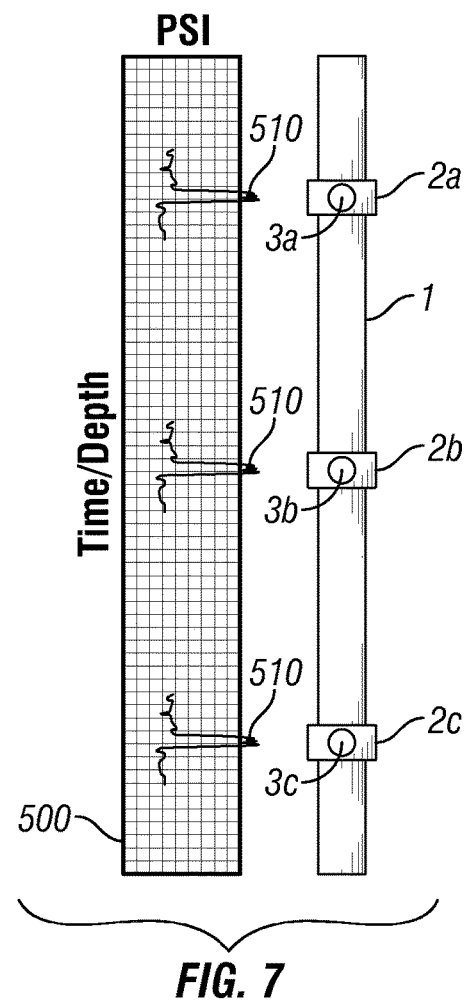
FIG. 7 shows the pressure increase for individual collars located along a casing string.

FIG. 7 shows a pressure schematic 500 positioned adjacent a casing string 1 having a plurality of collars 2a, 2b, and 2c that emit a signal that may be detected by a CCL 110 of a hydraulic CCL 100. Collar 2a may include a material 3a that emits a radioactive signal. For example, material 3a may be a gamma isotope. Collar 2b may include a RFID chip 3b that may be detected by a RFID reader. Collar 2c may include an electric transducer 3c. The collar 2c may be detected by a CCL 110 that detects an acoustic signal emitted from the electric transducer 3c. The pressure schematic 500 indicates the pressure within the work string 10 when the CCL 110 of the hydraulic CCL 100 is positioned along the casing string 1. An increase in pressure within the work string 10 is indicated by spike 510 on the pressure schematic 500 at each collar 2a, 2b, and 2c along the casing string 1 that is detected by the CCL 110 of the hydraulic CCL 100.

Figure 8:
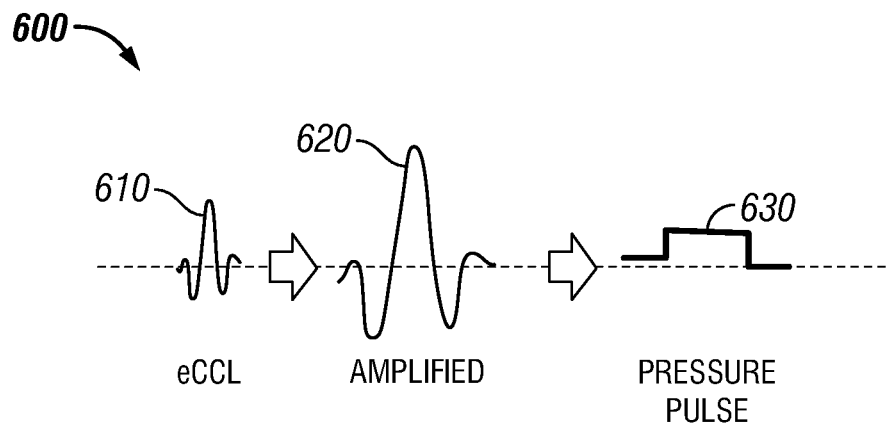
FIG. 8 shows a schematic of signals and a pressure pulse within a work string.

FIG. 8 shows a schematic 600 of a signal 610 from a CCL 110. The signal 610 from the CCL 110 may be amplified by an amplifier to create an amplified signal 620. The amplified signal 620 may be communicated to a valve 120 within the hydraulic CCL 100. The amplified signal 620 may actuate the valve 120, which causes a reduction in a flow area through the hydraulic CCL 100. The reduction of flow area through the hydraulic CCL 100 creates a pressure pulse 630 within the work string 10 to indicate that the hydraulic CCL 100 is positioned adjacent a collar 2 along a casing string 1. The system may be varied so that the signal 610 indicating that the CCL 110 has located collar 2 may be communicated directly to the valve 120 and be sufficient to trigger the actuation of the valve 120 to create the pressure pulse 630 as would be appreciated by one of ordinary skill in the art having the benefit of this disclosure.

Figure 9:
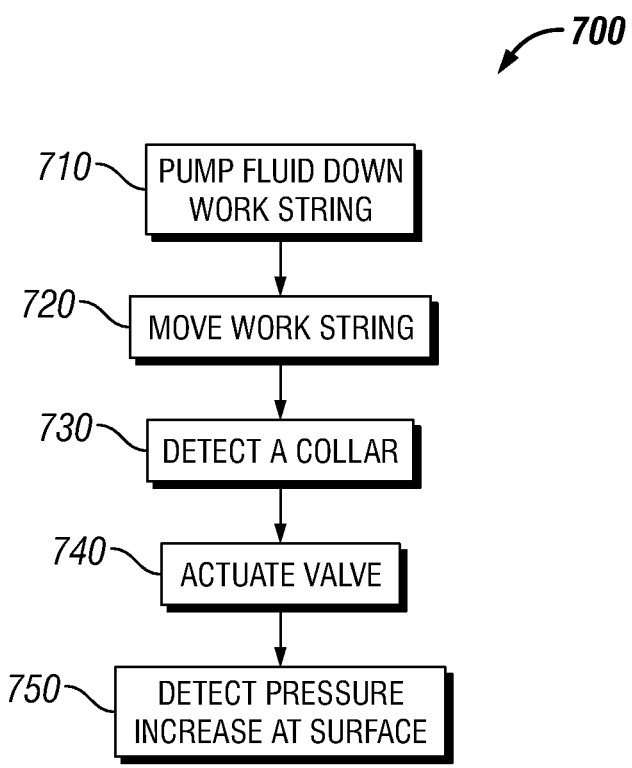
FIG. 9 shows a flow chart of one embodiment of a method of detecting a collar along a casing string with a hydraulic CCL.

FIG. 9 shows an embodiment of a method 700 of detecting collars along a casing string. Fluid is pumped down a work string 10 positioned within a casing string 1 as step 710. The work string 10 is moved along the casing string 1 at step 720 to move the hydraulic CCL 100 adjacent to a collar 2 along the casing string 1. At step 730, a collar 2 is detected by the CCL 110 of the hydraulic CCL 100. As discussed herein, the CCL 110 may detect the collar 2 due to a change in magnetic flux, may detect a signal emitted from the collar 2, or may detect the collar 2 due to other mechanisms as would be appreciated by one of ordinary skill in the art having the benefit of this disclosure. The detection of a collar 2 at step 730 triggers the actuation of a valve 120 within the hydraulic CCL 100 at step 740. The actuation of the valve 120 at step 740 decreases a flow area within a portion of the hydraulic CCL 100 creating a pressure increase within the work string 10. The pressure increase within the work string 10 is detected at the surface at step 750 of the method 700. The method 700 provides for a reliable method of locating collars 2 along a casing string 1 while permitting the use of the work string 10 to pump various fluids such as treatment and/or fracturing fluids without damaging components of the hydraulic CCL 100.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:
1. A device comprising:
   a casing collar locator (CCL) configured to individually detect one or more collars located along a casing string; and
   a valve in communication with the CCL;

wherein upon detection of an individual collar of the one or more collars the CCL sends a signal to the valve; and wherein the valve is actuated upon reception of the signal from the CCL.

2. The device of claim 1, further comprising an amplifier in communication with the CCL and a power source in communication with the amplifier, the valve being in communication with the CCL via the amplifier and power source, wherein upon the detection of the individual collar the CCL sends a signal to the amplifier and the amplifier send the a signal to the valve, and wherein the valve is actuated upon reception of the signal from the amplifier.

3. The device of claim 1, wherein the actuation of valve restricts a flow area that creates a pressure increase.

4. The device of claim 3, wherein the pressure increase is at least 200 psi.

5. The device of claim 3, wherein the CCL is further configured to detect a change in magnetic flux between the casing string and the one or more collars.

6. The device of claim 5, wherein the CCL further comprises a magnet and a coil.

7. The device of claim 3, wherein each collar of the one or more collars emits a signal and the CCL is further configured to detect the emitted signal.

8. The device of claim 7, wherein each collar of the one or more collars further comprises a gamma isotope and the CCL further comprises a gamma ray detector.

9. A method of detecting collars along a casing string comprising:
pumping fluid down a work string positioned within a casing string;
moving the work string along the casing string;
detecting a collar along the casing string with a casing collar locator (CCL) connected to the work string; and
actuating a valve within the work string due to the detection of the collar along the casing string, wherein the actuation of the valve comprises reducing a flow area in a portion of the work string.

10. The method of claim 9, further comprising moving the work string to move the CCL past the collar and removing the flow reduction through the portion of the work string.

11. The method of claim 9, wherein detecting the collar further comprises detecting a change in magnetic flux between the collar and the casing string.

12. The method of claim 9, wherein the actuation of the valve causes a pressure increase within the work string.

13. The method of claim 12, further comprising detecting at a surface location the pressure increase within the work string.

14. The method of claim 9, wherein detecting the collar further comprises detecting a signal emitted from the collar.

15. The method of claim 14, wherein detecting the signal emitted from the collar further comprises detecting an emission from a gamma isotope with a gamma ray detector.

16. The method of claim 14, wherein detecting the signal emitted from the collar further comprises detecting an acoustic signal emitted from an electric transducer.

17. A system to detect collars along a casing string comprising:
a work string positioned within a casing string;
a casing collar locator (CCL) configured to detect collars along the casing string, the CCL connected to the work string and positioned within the casing string; and
a valve in communication with the CCL, the valve positioned within the work string;
wherein upon detection of a collar the valve is actuated to reduce a flow area through a portion of the work string.

18. The system of claim 17, further comprising:
an amplifier in communication with the CCL, the amplifier positioned within the casing string; and
a power source in communication with the amplifier, the power source positioned within the casing string;
wherein the valve is in communication with the CCL via the amplifier;
wherein upon reception of the signal from the CCL the amplifier sends a signal to the valve to actuate the valve.

19. The system of claim 17, wherein the work string further comprises coiled tubing.

20. The system of claim 17, wherein actuation of the valve creates a pressure increase in the work string.

21. The system of claim 17, wherein the CCL is further configured to detect a change in magnetic flux between the casing string and the collar.

22. The system of claim 17, wherein each collar emits a signal and the CCL is further configured to detect the emitted signal.

* * * * *